United States Patent Office 3,160,445
Patented Dec. 8, 1964

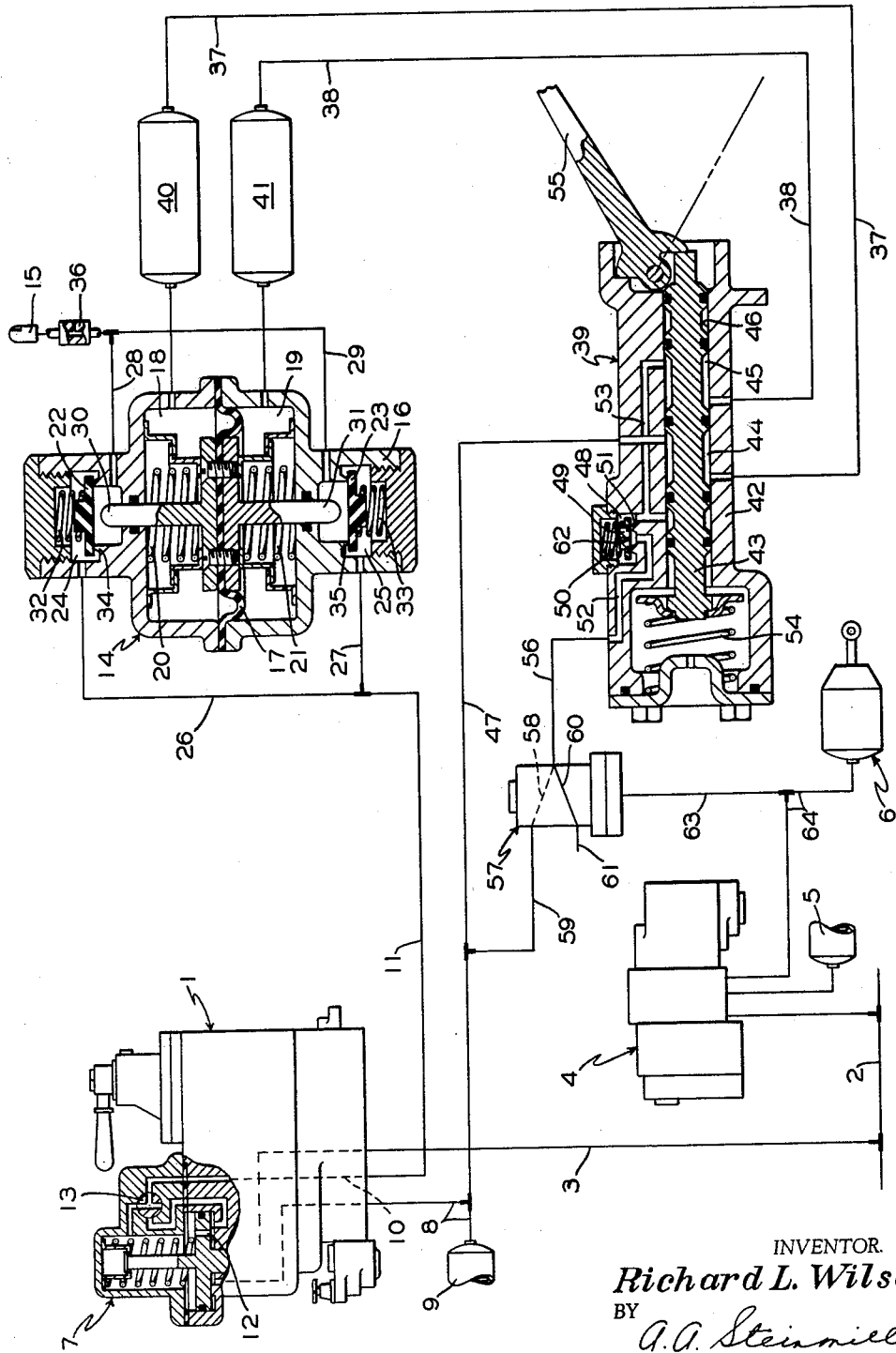

3,160,445
FLUID PRESSURE BRAKE APPARATUS WITH PERIODIC ACKNOWLEDGEMENT TYPE SAFETY CONTROL
Richard L. Wilson, Trafford, Pa., assignor to Westinghouse Air Brake Company, Wilmerding, Pa., a corporation of Pennsylvania
Filed May 22, 1963, Ser. No. 282,413
6 Claims. (Cl. 303—19)

This invention relates to fluid pressure operable brake apparatus with periodic acknowledgement safety control means which requires certain periodic acknowledging operations by the operator of the vehicle to forestall a penalty control operation, such as a brake application which will otherwise be effected automatically by the safety control means should the operator fail to perform said acknowledgement operations.

A safety control device or apparatus may be associated with the braking system of a vehicle for the purpose of insuring that the vehicle brakes would be applied automatically in the event that the operator of a vehicle, such as a railway train, for example, becomes incapacitated for performing his duties. Some of the presently known devices, such as a "dead-man" valve which requires that the operator positively depress a foot pedal associated therewith to prevent a brake application from being effected automatically, are inadequate in that the purpose thereof can be easily defeated by the operator placing a weight on the foot pedal to hold it depressed. Other safety control apparatus have been devised which require periodic acknowledging operations by the operator, the interval of frequency of such periodic acknowledging operations being determined in some instances by a fixed period of time, in others a fixed distance traveled by the vehicle, while in others the time interval is related to the rate of speed of the vehicle so that the higher the rate of speed, the shorter the time interval and hence the greater the frequency of acknowledgement operation. Some of the latter-mentioned apparatus are complex in structure and function and are, therefore, susceptible to malfunctioning and failure as well as being costly to produce.

Accordingly, the object of this invention is to provide an improved safety control apparatus of the periodic ackowledging type for use with fluid pressure brake apparatus and for use primarily with railway locomotive brake equipment, though not necessarily limited to such use, said improved safety control apparatus being characterized by simplicity in structure and, therefore, more reliability in operation.

The invention comprises a fluid pressure operable cycling safety control circuit interposed in the safety control pipe between the engineer's automatic brake valve and a signaling device such as a whistle via which whistle fluid pressure may be released, at a restricted rate, from said safety control pipe unless otherwise checked. As is well known, reduction of fluid pressure in the safety control pipe, unless checked before reaching a certain low value, will effect a penalty brake application. According to the invention, to prevent the penalty brake application, the operator is required to alternately operate a foot pedal associated with a foot valve device between two positions for causing fluid pressure to be alternately released from and supplied to opposite sides of a piston in a double-acting valve device interposed in the safety control pipe. Displacement of the piston in either direction toward two opposite positions, in response to a pressure differential existing between the opposite sides of the piston, causes either one valve or another in the double-acting valve device to be opened and thereby permit venting of the safety control pipe via the whistle. By alternately operating the foot pedal between its two positions responsively to the signal emitted by the whistle and within prescribed time intervals, the operator thereby prevents the piston and the respective valve open at that instant from remaining in one position long enough for the pressure in the safety control pipe to blow down to the certain low value at which a penalty brake application would occur. Respective timing reservoirs of predetermined volume are connected to each side of the piston to provide the desired timing interval between each time the operator is required to change the position of the foot pedal.

The single figure drawing shows a schematic arrangement, partly in section, of a safety control circuit with a brake system of a railway locomotive and embodying the invention.

Description and Operation

For purposes of illustrating an application of the safety control apparatus embodying the invention, said apparatus is shown in the drawing as being operatively connected to brake control equipment of the fluid pressure operable type of a railway locomotive. The locomotive brake control equipment may be of any suitable type such as that fully described and illustrated in Instruction Pamphlet No. 5066, dated March 1957, and published by Westinghouse Air Brake Company, said brake control equipment being designated "24-RL Locomotive Brake Equipment." Since a detailed description of the brake control equipment is not deemed essential to an understanding of the invention, and since reference may be had to the above-mentioned publication, the brake control equipment as shown in the drawing will be only very briefly described. Such equipment comprises an engineer's automatic brake valve device 1 designated in the above-mentioned pamphlet as the "DS-24 Brake Valve" and manually operable by the engineer for controlling fluid pressure in a brake pipe 2 connected via a branch pipe or conduit 3 to said engineer's brake valve device. As is well known by those skilled in the art, operation of the engineer's brake valve device 1 for effecting a reduction of fluid pressure in the brake pipe 2 causes a brake control valve device 4, designated in the above-mentioned pamphlet as the "D-24 Control Valve," to effect supply of fluid under pressure from a source such as an auxiliary reservoir 5 to a brake cylinder device 6, whereby a brake application corresponding to the degree of reduction in brake pipe pressure is applied to the locomotive wheels (not shown). Operation of the automatic brake valve device 1 for effecting restoration of fluid pressure in the brake pipe 2 to a preselected normal value causes the brake control valve device 4 to effect venting of brake-applying pressure from the brake cylinder device 6 and thereby release of the brake application.

One of the components of the automatic brake valve device 1 is an application portion 7 comprising valve means (not shown) operated by a piston subjected on one side to fluid pressure in a pressure chamber adjacent thereto, said chamber being supplied with fluid under pressure via a pipe 8 from a source, such as a main reservoir 9 which may be charged with fluid at a pressure of 140 p.s.i., for example, while the opposite side of said piston is subjected to the force of a biasing spring and fluid pressure in a control chamber adjacent thereto, said control chamber having one end of a safety control passage 10 opening thereinto, while the other end of said control passage connects to one end of a safety control pipe 11. Both the passage 10 and the pipe 11 are charged, at a restricted rate, from the main reservoir 9 via the pressure chamber and the control chamber of the application portion 7, which are connected by a choked passage 12 extending through the piston from one side thereof to the other. When fluid pressure in the control passage 10 and, therefore, in the control chamber is reduced below a preselected critical low value such as 90 p.s.i., for example, the piston-operated valve means is actuated by the opposing pressure in the pressure chamber to a brake application position, whereby the automatic brake valve device 1 is actuated to cause a reduction of fluid pressure in brake pipe 2 for effecting a brake application, as above described. When fluid pressure in the control passage 10 is restored to a value above 90 p.s.i., the piston-operated valve means is returned to a normal position in which the brake valve device 1 effects restoration of normal fluid pressure in the brake pipe 2, and the control valve device 4 effects a release of the brake application.

It should be understood that each of the cars making up a train is provided with a brake control valve device similar to the brake control valve device 4 and that the brake pipe 2 extends the entire length of the train so that the brakes on the entire train are controlled from the engineer's automatic brake valve device 1.

In locomotive brake equipment of the type above described, the safety control passage 10 is normally connected via pipe 11 to a safety control device or devices such as the "dead-man" valve device above described, and an audible or visible warning device for indicating that the safety control devices have been actuated in response to an emergency situation.

A cut-out cock 13, manually operable from the exterior of the automatic brake valve device 1, is interposed in safety control passage 10 between the control chamber of the service application portion 7 of said valve device and the pipe 11, thereby, in the event of undesirable pressure reduction in said safety control passage due to malfunctioning of the safety control devices or excessive leakage of fluid pressure in the safety control system, the cut-out cock may be operated to close off communication between said service application portion and the safety control devices to prevent untimely application of the brakes due to said malfunctioning of said safety control devices or excessive leakage therein.

According to the present invention, a double-acting valve device 14 is interposed in pipe 11 between the automatic brake valve device 1 and a signaling device such as a whistle 15.

The double-acting valve device 14 comprises a casing 16 having therein a diaphragm type piston 17 subjected on opposite sides to fluid pressure prevailing in respective adjacent chambers 18 and 19 formed in said casing. A pair of caged springs 20 and 21, disposed in chambers 18 and 19, respectively, bias the piston 17 to a central or neutral position to be defined shortly and in which it is shown in the drawing.

Valves 22 and 23 are disposed in respective chambers 24 and 25 formed at the respective axial extremities of the casing 16 for controlling communication between safety control pipe 11 and the whistle 15. Branch pipes 26 and 27 connect safety control pipe 11 to the respective chambers 24 and 25 on corresponding sides of valves 22 and 23, while branch pipes 28 and 29 connect said chambers, respectively, to the whistle 15 from the opposite sides of said valves. Diaphragm piston 17 is provided with a pair of equi-length piston stems 30 and 31 extending coaxially from each side of said piston, said stems each being of such length as to terminate short of contact with the respective valves 22 and 23 when said piston is in its central or neutral position.

The valves 22 an 23 are biased by springs 32 and 33 toward seated position on valve seats 34 and 35, respectively, in which seated positions communication between branch pipes 26 and 28 and between branch pipes 27 and 29, respectively, and therefore between safety control pipe 11 and the whistle 15 is cut off. Axial displacement of diaphragm piston 17 in an upwardly direction, as viewed in the drawing, to a first or upper venting position causes the end of piston stem 30 to contact and move valve 22 to an unseated position from valve seat 34, in which unseated position safety control pipe 11 is vented to atmosphere by way of whistle 15, at a restricted rate, via branch pipe 26, through chamber 24 past unseated valve 22, through branch pipe 28, and an atmospheric vent choke 36 interposed between pipe 28 and the whistle 15. With piston 17 in its upper venting position, of course, valve 23 remains in its seated position. Similarly, axial displacement of piston 17 in a downwardly direction to a second or lower venting position causes the end of stem 31 to move valve 23 to an unseated position in which safety control pipe 11 is vented to atmosphere by way of whistle 15 via branch pipe 27, chamber 25, branch pipe 29 and choke 36.

Axial displacement of piston 17 to either its upper or lower venting position occurs when a pressure differential exists between the respective pressures acting on the opposite sides of said piston, the direction of such displacement depending upon the dominating pressure of the respective prevailing pressures in the chambers 18 and 19. Chambers 18 and 19 are connected via respective pipes 37 and 38 to a foot-operated valve device 39, said pipes having interposed therein respective timing or volume reservoirs 40 and 41 for a purpose to be hereinafter disclosed.

The foot-operated valve device 39 comprises a casing 42 in which a spool-type valve 43, provided with annular grooves or recesses 44 and 45, is slidably operable in a coaxial bore 46 formed in said casing, said grooves being constantly in registry with the pipes 37 and 38 which connect to said coaxial bore. A supply pipe 47 connecting to pipe 8 and, therefore, to main reservoir 9, is connected to the coaxial bore of the valve device 39 also. Also disposed in a chamber 48 formed in the valve device 39 is a check valve 49 biased by a spring 50 toward a seated position on a valve seat 51 surrounding one end of a passageway 52 formed in the casing 42. Chamber 48 opens to one end of a passageway 53 which also opens to the bore 46.

The spool valve 43 is biased by a spring 54 toward a first supply position in which it is shown in the drawing and in which pipe 37 is placed in communication with pipe 47 via groove 44 while pipe 38 is placed in communication with passageway 53 via groove 45. The spool valve 43 is operable to a second supply position by depression of a pivotally mounted foot pedal 55 out of a raised position, in which it is shown in the drawing, to a lowered position indicated by a broken line in the drawing. In its second supply position, spool valve 43 cuts off communication between pipes 37 and 47 and between pipe 38 and passageway 53 and opens communication between pipes 38 and 47, via groove 45, and between pipe 37 and passageway 53, via groove 44.

Passageway 52 in the foot-operated valve device 39 is connected via a pipe 56 to a two-position relay valve device 57 including, though not shown, piston-operated valve means spring biased toward a normally occupied closed position in which a communication 58, indicated diagrammatically in the drawing by a broken line, is closed between pipe 56 and a pipe 59 connecting to supply pipe 47, and in which closed position a venting communication 60, indicated diagrammatically in the drawing by a solid line, is open between pipe 56 and an atmospheric vent 61. Therefore, in the normally occupied closed position of the piston-operated valve means of the relay valve device 57, of the foot-operated valve device 39, passageway 52 and therefore passageway 53 via a choke 62 formed in the valve 49 are vented to atmosphere via pipe 56, communication 60 and vent 61. The piston-operated valve means in the relay valve device 57 is operable responsively to fluid in a control chamber (not shown) at a pressure adequate for overcoming the opposing force of the biasing spring acting on said valve means to an open position in which communication 60 is closed and communication 58 is opened for a purpose to be hereinafter disclosed.

The control chamber in the relay valve device 57 is connected via a branch pipe 63 to a pipe 64 via which pressurized fluid is supplied from the brake control valve device 4 to the brake cylinder device 6 when a brake application is effected, the fluid pressure in said control chamber therefore corresponding to that supplied to said brake cylinder for a reason to be hereinafter disclosed.

In operation, it may be assumed that the vehicle on which the apparatus embodying the invention is mounted, is under way and in motion, that the brakes (not shown) are in a released state so that no pressure prevails in the control chamber of the relay valve device 57 and the piston-operated valve means (not shown) is in its closed position, that the main reservoir 9 is fully charged with pressurized fluid, and that foot pedal 55 has just been released to its raised position (in response to an audible signal from the whistle 15 to be more fully explained hereinafter) to cause spool valve 43 to be biased by spring 54 to its first supply position. With spool valve 43 in its first supply position, pressurized fluid may flow from main reservoir 9, via pipes 8 and 47, via groove 44 in said spool valve to pipe 37, thence to timing reservoir 40 and chamber 18 of the double-acting valve device 14. At the same time, prevailing pressure in chamber 19 of the double-acting valve device 14 and in reservoir 41 is reduced at a restricted rate determined by choke 62 in the valve device 39, via pipe 38, groove 45 in the spool valve 43, passageway 53, choke 62 in valve 49, passageway 52, pipe 56, communication 60 and atmospheric port 61. Thus while fluid pressure is building up in chamber 18 of the double-acting valve device 14, fluid pressure in chamber 19 is diminishing until the differential therebetween is sufficient to cause piston 17 to be moved to its lower venting position in which valve 23 is operated to its unseated position.

When valve 23 is operated to its unseated position, pressurized fluid from safety control pipe 11 is vented to atmosphere via whistle 15 and choke 36, in the manner above described, to cause said whistle to emit a warning sound to the operator. As was noted above, if fluid pressure in safety control pipe 11 is permitted to reduce to a value below the critical low value of 90 p.s.i., a brake application is automatically effected. Since it is the operator's responsibility to prevent the pressure in the safety control pipe 11 from reducing to the critical low value, upon hearing the warning sound from the whistle 15, he depresses the foot pedal 55 to its lowered position to effect operation of the spool valve 43 to its second supply position.

With spool valve 43 in its second supply position, supply of pressurized fluid is cut off from reservoir 40 and chamber 18 and is diverted to reservoir 41 and chamber 19 of the double-acting valve device 14, in the manner above described, the pressure in said reservoir 40 and chamber 18 immediately commencing to reduce at a restricted rate via atmospheric vent 61 in the relay valve device 57, as above noted. As the pressure in chamber 18 continues to reduce and the pressure in chamber 19 continues to build up, said pressures eventually equalize to thereby cause piston 17 to move out of its lower venting position to its neutral position, thereby allowing valve 23 to be moved to its seated position to cut off, for the moment, further reduction of fluid pressure from the safety control pipe 11. As the respective pressures in chambers 18 and 19 continue to reduce and build up respectively, a differential therebetween is again established effective for causing continued displacement of piston 17 to its upper venting position and thereby unseating of valve 22 to again cause the safety control pipe 11 to be vented to atmosphere via choke 36 and whistle 15, in the manner above noted.

The time interval lapsed from the instant valve 23 seats and cuts off momentary reduction of fluid pressure in pipe 11 until valve 22 is unseated to reopen pipe 11 to atmosphere, is determined by the rate at which choke 62 in the foot-operated valve device 39 allows fluid pressure to dissipate from chamber 18 and reservoir 40 and by the volume of reservoir 41. These timing factors are so calculated as to provide a time interval of sufficient duration to permit fluid pressure in the safety control pipe 11 to be restored to maximum pressure of 140 p.s.i. after a reduction therein has been terminated and before reduction is recommenced. A similar time interval is provided, of course, when piston 17 moves from its upper venting position to its lower venting position.

With valve 22 unseated and pipe 11 again being vented to atmosphere via whistle 15, the operator is again alerted by the warning sound emitted by the whistle. Upon hearing the warning sound and in order to prevent a penalty brake application, the operator releases the foot pedal 55, which resumes its raised position, and the spool valve 43 is restored by the spring 54 to its first supply position. In a fashion similar to that above discussed in connection with effecting operation of piston 17 of the double-acting valve device 14 from its lower venting position to its upper venting position, operation of the foot pedal 55 to its raised position and of spool valve 43 to its first supply position effects operation of said piston from its upper venting position, through its neutral position, to its lower venting position.

Thus, each time the operator hears a warning signal from the whistle 15, he alternately depresses and releases foot padel 55 to effect, in the manner above described, cycling action of the double-acting valve device 14, the duration of each cycle being determined, as was above noted, by the capacities of the timing reservoirs 40 and 41 and the flow rate of choke 62 in the valve device 39. By performing the required operation in response to each warning sound emitted by the whistle 15 and thereby preventing a penalty brake application, the operator demonstrates his alertness. On the other hand, if the operator fails to respond due to his becoming incapacitated, a brake application is automatically effected to bring the train or vehicle to a stop and thereby prevent any damaging results.

As was previously mentioned above, the piston-operated valve means (not shown) in the relay valve device 57 normally occupies a closed position in which communication 58 is closed and communication 60 is open, both said communications having been defined previously herein, said communication 60 being the one via which fluid pressure from either chamber 18 or chamber 19 of the double-acting valve device 14 is vented, depending upon the position of piston 17. As was also previously noted, the relay valve device 57 has a control chamber therein connected by conduit 63 to the brake cylinder supply conduit 64.

If it be assumed now that the operator intentionally initiates a brake application by operating the engineer's brake valve 1, pressurized fluid is supplied via pipe 64 to the brake cylinder device 6, and such fluid pressure also prevails in the control chamber of the relay valve device 57 which is connected by way of pipe 63. The piston-operated valve means in the relay valve device 57 is operable responsively to fluid in the control chamber above a predetermined pressure (such as a minimum of 25 p.s.i., for example, adequate for causing the brake cylinder 6 to effect a service brake application and adequate for overcoming the opposing force of the biasing spring acting on said piston-operated valve means) to its open position, in which, as above noted, communication 60 is closed and communication 58 is opened.

With communication 60 cut off, neither of the chambers 18 or 19 of the double-acting valve device 14 can be vented to atmosphere. But with communication 58 open, pressurized fluid from main reservoir 9 flows via pipe 8, pipe 59, communication 58, pipe 56, passageway 52 to the underside of valve 44 to unseat said valve, past unseated valve 44, and via passageway 53 to either pipe 37 or pipe 38, depending upon the position of the spool valve 43 at the time the brake application is initiated by the operator. It is immaterial which position the spool valve 43 is occupying at the moment, for, if pipe 38, for example, is connected to passageway 53 through groove 45 and, therefore, being supplied with pressurized fluid from main reservoir 9, pipe 37 is simultaneously supplied with pressurized fluid from said main reservoir via pipe 8, pipe 47 and groove 44 in the spool valve 43.

With both pipes 37 and 38 being supplied simultaneously with pressurized fluid from main reservoir 9, said pressurized fluid is also supplied simultaneously to both reservoirs 40 and 41 and to both chambers 18 and 19 on opposite sides of piston 17 in the double-acting valve device 14. The respective pressures acting on the opposite sides of piston 17 are thus equalized, and said piston is maintained in its neutral position by the caged springs 20 and 21 as long as said equalized pressure condition prevails. With piston 17 in its neutral position, both valves 22 and 23 are maintained in their respective seated positions by the respective spring 32 and 33, and venting of safety control pipe 11, as well as the sounding of whistle 15, is thus prevented during such time that a brake application is in effect. It is not necessary, therefore, for the operator to periodically operate the foot padel 55 to demonstrate his alertness, because the fact that he has intentionally initiated a brake application indicates that he is alert.

Of course, when the operator effects a release of the brake application, fluid pressure in the control chamber of the relay valve device 57 is also dissipated, and the piston-operated valve means (not shown) is biased to its closed position to cut off communication 58 and reopen communication 61. With communication 61 reopened, valve 49 in the foot-operated valve device 39 is reseated by spring 50, and whichever pipe of the two pipes 37 and 38 is, at the moment, connected to passageway 53, such pipe and the chamber of the two chambers 18 and 19 connected thereto, are vented to atmosphere via vent 61 of the relay valve device 57 to effect a pressure differential between the opposite sides of piston 17. A pressure differential between the opposite sides of piston 17 causes said piston to move to either its upper or lower venting position to initiate venting of safety control pipe 11 via the whistle 15. Upon hearing the warning sound emitted by whistle 15, the operator again begins periodic operation of the foot pedal 55 between its raised and lowered positions to prevent a penalty brake application in the manner above described.

Having now described the invention, what I claim as new and desire to secure by Letters Patent, is:

1. A fluid pressure safety control system for use on a railway type vehicle, said safety control system comprising:
   (a) a control pipe normally charged with fluid at a preselected pressure and in which a reduction in excess of a certain amount from said preselected pressure is effective to initiate a penalty control operation,
   (b) atmospheric vent means via which reduction of fluid pressure in said control pipe may be effected at a restricted rate,
   (c) a double-acting valve device interposed between said control pipe and said atmospheric vent means for controlling communication therebetween, said double-acting valve device comprising:
      (i) a first valve having a seated position in which communication between said control pipe and said atmospheric vent means is closed and being operable to an unseated position in which such communication is open,
      (ii) a second valve disposed oppositely to said first valve and having a seated position in which communication between said control pipe and said atmospheric vent means is closed and being operable to an unseated position in which such communication is open,
      (iii) a piston operably disposed between said first and second valves and having arranged adjacently to opposite sides thereof respective fluid pressure control chambers, said piston being biased toward a neutral position, in which both said first and said second valves are in their respective seated positions, and being operable out of its said neutral position, in response to a fluid pressure differential between respective pressures prevailing in said oppositely arranged control chambers, to either a first position in which operation of said first valve to its unseated position is effected, or to a second position, in which operation of said second valve to its unseated position is effected, depending upon the direction of the resultant differential force between the opposing pressures in said control chambers,
   (d) pipe means via which pressurized fluid may be supplied to one and released from the other of said oppositely arranged control chambers concurrently, and
   (e) control means interposed in said pipe means for alternately effecting said concurrent supply of pressurized fluid to one of said control chambers and release thereof from the other of said control chambers for reciprocably changing the direction of said resultant differential force to cause reciprocating movement of said piston between its said first and said second positions.

2. A fluid pressure safety control system, as defined in claim 1, wherein said control means comprises a manually operable valve device having one position, in which one of said control chambers is supplied with pressurized fluid while the other chamber is concurrently relieved of fluid pressure, and being operable to a different position in which said one chamber is relieved of fluid pressure while the other chamber is concurrently supplied with pressurized fluid.

3. A fluid pressure safety control system, as defined in claim 2, further characterized by flow rate control means interposed in said pipe means and effective for restricting the rate at which fluid pressure is relieved from said one or said other of said control chambers during release of fluid pressure therefrom to thereby provide a predetermined delay in change of direction of the differential force.

4. A fluid pressure safety control system, as defined in claim 3, further characterized by a pair of timing reservoirs interposed in said pipe means, one of said timing reservoirs being connected to said one control chamber and the other of said timing reservoirs being connected to said other control chamber to thereby provide respective prescribed time intervals required for operation of said piston from its said first position to its said second position and reversely, according to the respective volumes of said timing reservoirs and the flow rate of said flow rate control means.

5. In a fluid pressure brake system for a railway type vehicle, the combination with a brake pipe normally charged with fluid at a predetermined pressure, a brake cylinder device operable responsively to fluid pressure for effecting a brake application on the vehicle according to the degree of fluid pressure supplied to said brake cylinder device, and a control valve device operable responsively to a reduction of fluid pressure in said brake pipe for effecting supply of fluid to the brake cylinder at a degree of pressure according to the degree of reduction in said brake pipe pressure, of a safety control system comprising:
   (a) application valve means operative to effect a reduction of fluid pressure in the brake pipe,
   (b) a control pipe normally charged with fluid at a preselected pressure and effective upon a reduction in excess of a certain amount from said preselected pressure for effecting operation of said application valve means to cause a reduction of fluid pressure in the brake pipe to effect a penalty application.
   (c) atmospheric vent means via which reduction of fluid pressure in said control pipe may be effected at a restricted rate, (d) a double-acting valve device interposed between said control pipe and said atmospheric vent means for controlling communication therebetween, said double-acting valve device comprising:
  (i) a first valve having a seated position in which communication between said control pipe and said atmospheric vent means is closed and being operable to an unseated position in which such communication is open,
  (ii) a second valve disposed oppositely to said first valve and having a seated position in which communication between said control pipe and said atmospheric vent means is closed and being operable to an unseated position in which such communication is open,
  (iii) a piston operably disposed between said first and second valves and having arranged adjacently to opposite sides thereof respective fluid pressure control chambers, said piston being biased toward a neutral position, in which both said first and said second valves are in their respective seated positions, and being operable out of its said neutral position, in response to a fluid pressure differential between respective pressures prevailing in said oppositely arranged control chambers, to either a first position in which operation of said first valve to its unseated position is effected, or to a second position in which operation of said second valve to its unseated position is effected, depending upon the direction of the resultant differential force between the opposing pressures in said control chambers, (e) pipe means via which pressurized fluid may be supplied to one and released from the other of said oppositely arranged control chambers concurrently, and (f) control means interposed in said pipe means for alternately effecting said concurrent supply of pressurized fluid to one of said control chambers and release thereof from the other of said control chambers for reciprocably changing the direction of said resultant differential force to cause reciprocating movement of said piston between its said first and said second positions.

6. The combination defined in claim 5, further characterized by a two-position valve device interposed in said pipe means and normally occupying one position in which a venting communication is provided via which said release of fluid pressure from one of said control chambers is effected during concurrent supply of pressurized fluid to the other of said control chambers, said two-position valve device being operable responsively to a preselected fluid pressure in the brake cylinder device during a prevailing brake application, to a different position for closing said venting communication and opening a supply communication for effecting supply of pressurized fluid, concurrently, to both said control chambers to cause equalization of fluid pressure on both sides of said piston and thereby operation thereof to its neutral position during such time that said brake application is in effect.

References Cited in the file of this patent

UNITED STATES PATENTS 2,820,677     Jados _____ Jan. 21, 1958

FOREIGN PATENTS 335,634     Italy _____ Feb. 7, 1936